(12) United States Patent
Hussain

(10) Patent No.: US 6,823,056 B1
(45) Date of Patent: Nov. 23, 2004

(54) MULTIPLE SERVICES PER TRIGGER WITHIN A TELECOMMUNICATIONS NETWORK

(75) Inventor: Aamir M. Hussain, Marietta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 283 days.

(21) Appl. No.: 09/653,777

(22) Filed: Sep. 1, 2000

(51) Int. Cl.[7] .............................................. H04M 3/42
(52) U.S. Cl. ........................... 379/207.02; 379/201.02; 379/201.03; 379/201.05; 379/201.01
(58) Field of Search ...................... 379/201.02, 201.03, 379/201.05, 207.11, 207.12, 207.14, 207.15, 211.01, 211.02, 221.08, 221.09, 230

(56) References Cited

U.S. PATENT DOCUMENTS

| | | | |
|---|---|---|---|
| 5,430,719 A | 7/1995 | Weisser, Jr. ................. 370/389 |
| 5,920,618 A | 7/1999 | Fleischer, III et al. .. 379/221.09 |
| 5,966,434 A | * 10/1999 | Schafer et al. ......... 379/201.01 |
| 5,999,610 A | * 12/1999 | Lin et al. ................ 379/207.02 |
| 6,556,996 B1 | * 4/2003 | Kovarik et al. ................ 707/10 |

* cited by examiner

Primary Examiner—Bing Q. Bui
(74) Attorney, Agent, or Firm—Woodcock Washburn LLP

(57) ABSTRACT

Multiple subscriber services are associated with an individual trigger. The same trigger, such as a terminating attempt trigger ("TAT"), activates multiple associated subscriber services. A query mediator determines the order in which the multiple subscriber services are to be executed. After the first subscriber service has completed execution, the next subscriber service is executed, as determined by the query mediator using a priority system, for example, or processing continues without further subscriber services being executed, if a conflict would otherwise arise, for example, or if the executed subscriber service has disposed of the call.

27 Claims, 2 Drawing Sheets

MULTIPLE SERVICES PER TRIGGER WITHIN A TELECOMMUNICATIONS NETWORK

FIELD OF THE INVENTION

The present invention relates in general to subscriber services and features within a telecommunications network. More particularly, the present invention relates to multiple subscriber services and features associated with one trigger within such a network.

BACKGROUND OF THE INVENTION

With developments and improvements in telecommunications networks, telephone companies offer user-specific subscriber services to subscribers. Subscriber services include, for example, a calling line ID service that allows a subscriber to see the number of the caller, and perhaps his name; call forwarding variable where all or selected incoming calls are directly forwarded to a predefined forward-to-number; call forwarding busy where all or selected incoming calls toward a busy called party subscriber are forwarded to a predefined forward-to number; or anonymous call rejection where an incoming call connection to the subscriber is denied if the caller refuses to provide his calling line ID. Other subscriber services include privacy director which allows subscribers to screen calls by intercepting all calls with the calling party number marked as private or out of area, and requires the unidentified parties to either unblock their caller ID or to record their names before their calls are completed to the subscriber, and internet call waiting which allows internet users to receive notification of incoming calls on their PC screen during an active internet session.

In conventional telecommunications systems, each subscriber service is associated with a unique trigger. In other words, the telecommunications systems only support a single service per trigger. Because there are a limited number of triggers, the number of services that a subscriber can subscribe to is limited. This is particularly relevant if the subscriber wishes to subscribe to more services than there are triggers. In this case, the subscriber will not be able to obtain the desired functionality. Therefore, a need exists for a system and method that allows for multiple services per trigger.

SUMMARY OF THE INVENTION

The present invention is directed to a system and method for providing a plurality of subscriber services associated with a trigger to a subscriber responsive to a call. The trigger is received at a central office associated with the subscriber, and a query mediator determines a priority for each subscriber service. The subscriber services are stored in a service control point. The subscriber service having the highest priority is executed.

According to further aspects of the invention, the remaining subscriber services are executed in order of priority. If the executed subscriber service has disposed of the call, the remainder of the subscriber services are terminated.

According to other aspects of the invention, upon receiving a trigger query, the query mediator determines which subscriber services are activated by the subscriber, and then determines a priority for each of the active subscriber services.

The foregoing and other aspects of the present invention will become apparent from the following detailed description of the invention when considered in conjunction with the accompanying drawings.

DESCRIPTION OF EXEMPLARY EMBODIMENTS AND BEST MODE

Referring now to the figures, a preferred embodiment of the system and method of the present invention will be described. For purposes of this description, it is assumed that the reader is familiar with basic telephony concepts and terminology.

Figure 1:
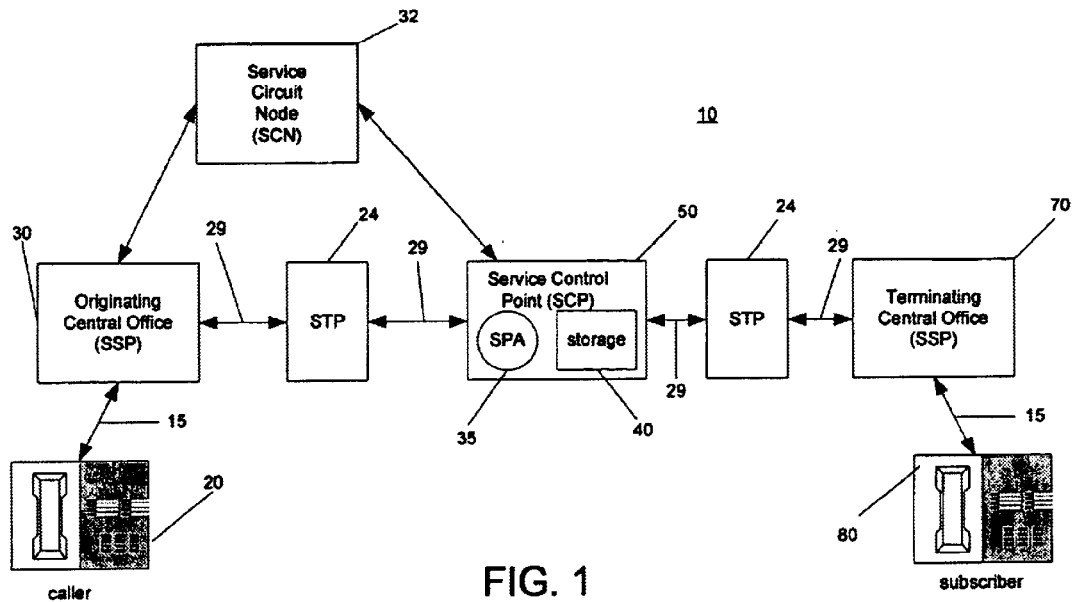
FIG. 1 shows a simplified schematic diagram of a telecommunications network including local telephone sets and their associated central offices, a service circuit node, and a service control point in accordance with an embodiment of the present invention.

Reference is now made to FIG. 1 illustrating an exemplary telecommunications network 10 that connects a call between a caller 20 and a subscriber 80 in accordance with the present invention. This exemplary environment is the public switched telecommunications network (PSTN). A portion of the PSTN is illustrated in FIG. 1 and generally described below.

In particular, the detailed portion of the PSTN illustrates a part of the AIN of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 30, 70 which are service switching points (SSPs). A central office or SSP is a switch and the terms are used interchangeably herein. As further illustrated in FIG. 1, the SSPs 30, 70 have a plurality of subscriber lines 15 connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones designated, e.g., as 20, 80. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs are interconnected by a plurality of trunk circuits. These are the voice path trunks that interconnect the SSPs to connect communications. The term "communication" or "call" is used herein to include all messages that may be exchanged between caller and called party in the network illustrated in FIG. 1. Each of the SSPs 30, 70 is connected to another type of AIN element referred to as a local signal transfer point (STP) 24 via respective data links 29. Currently, these are data links employing a signaling protocol referred to as Signaling System 7 (SS7), which is well known to those skilled in the art. Much of the intelligence of the AIN resides in yet another type of AIN element referred to as a local service control point (SCP) 50 that is connected to STP 24 over an SS7 data link. Among the functions performed by the SCP 50 is the maintenance of network databases and subscriber databases. These databases may be used in providing temporary telecommunications services to a customer. Typically, the SCP 50 is also the repository of service package applications (SPAs) 35 that are used in connection with or as part of the databases or other storage devices in the application of telecommunication services, enhanced features, or subscriber services to calling lines.

In order to keep the processing of data and calls as simple as possible, a relatively small set of triggers is defined as the SSPs for each call. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 50 through the STP 24. The return packet includes instructions to the switch as to how to process the call. The instructions may be to take some special action as a result of a customized calling service, enhanced feature, or subscriber service. In response, the switch moves through its call states, collects the called digits, and generates further packets that are used to set up and route the calls. Similar devices for routing calls among various local exchange carriers are provided by regional STP and regional SCP.

The AIN may also include a service circuit node 32 (SCN), which may also be referred to herein as a service node. The SCN 32 includes voice and dual tone multifrequency (DTMF) signal recognition devices and voice synthesis devices. In addition, the SCN 32 may include a data assembly interface. The SCN 32 is connected to the local SCP via data links using an X.25 protocol. In addition, the SCN 32 typically is connected to one or more (but usually only a few) SSPs via Integrated Service Digital Network (ISDN) links.

Thus, each telephone set (e.g., caller 20 and subscriber 80) is connected via a telephone line 15 (e.g., POTS, or similar) to a telephone system including central office switches 30, 70, at least one STP 24, and at least one SCP 50. The SCP 50 contains control logic and feature data, and is a centralized node in the system. A SPA 35 processes calls and is running on the SCP 50. Each central office switch 30, 70 may be connected to a plurality of subscriber sets. Additionally, the SCP 50 may provide routing instructions to a plurality of central offices. Connections 29 between the central offices 30, 70, the STP 40, and the service control point 50 are preferably TCP/IP high speed network connections (e.g., fiber optic, ethernet, etc.).

Figure 2:
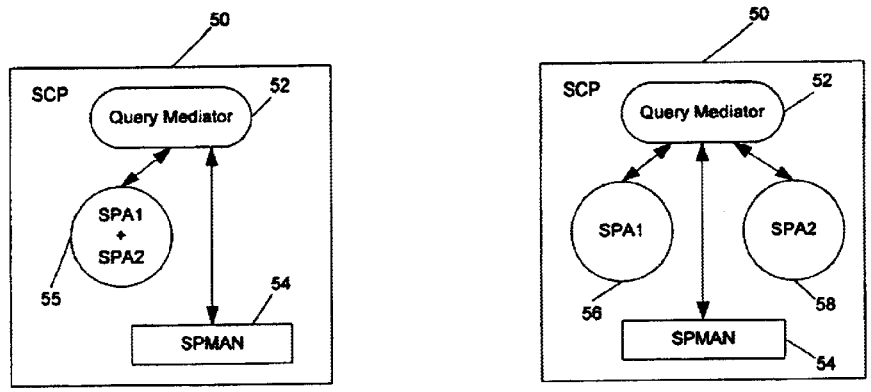
FIG. 2 shows a simplified schematic diagram of an exemplary service control point in accordance with the present invention.
Figure 3:
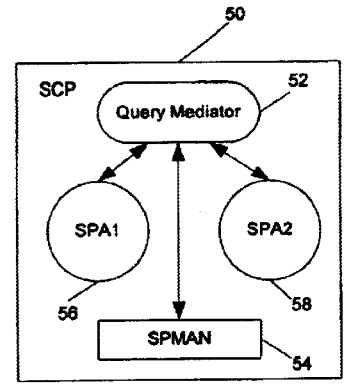
FIG. 3 shows a simplified schematic diagram of another exemplary service control point in accordance with the present invention.

In accordance with the present invention, multiple subscriber services are associated with an individual trigger. Thus, for example, the same trigger, e.g., a terminating attempt trigger ("TAT"), will activate a plurality of associated subscriber services (as long as the subscriber has subscribed to them), such as for example, internet call waiting and privacy director. The SCP 50 contains the functionality for the plurality of subscriber services either in a combined SPA 55 (preferred), as shown in FIG. 2, or as separate SPAs 56, 58, as shown in FIG. 3, for two subscriber services. In FIGS. 2 and 3, SPA1 refers to the SPA associated with one subscriber service (i.e., service 1), and SPA2 refers to the SPA associated with another subscriber service (i.e., service 2). SPA1 and SPA2 can either be combined into a combined SPA (e.g., SPA 55 in FIG. 2), or can be separate (e.g., SPAs 56, 58 in FIG. 3).

Thus, preferably, two individual SPAs with different translation types are deployed on one SCP as a pair in one combined SPA. It should be noted that multiple SPAs, such as three or more, could be deployed on the same SCP in a combined SPA. Alternatively, the plurality of SPAs could reside separately on the same SCP.

The SCP 50 also comprises a query mediator 52 that determines the order in which the multiple subscriber services are to be executed upon receiving a trigger. For example, if a subscriber subscribes to both service 1 and service 2, and the trigger corresponding to these services is activated, the query mediator 52 determines which service executes first, and whether the other service executes afterwards or whether the other service does not execute at all. A manager SPMAN 54 acts as a controller for passing the trigger to the query mediator 52.

If a subscriber only subscribes to one of the multiple subscriber services associated with a particular trigger, then when the trigger is activated, the SPA associated with the one subscriber service is activated (either from the combined SPA 55 in FIG. 2, or the individual SPA in FIG. 3), and processing continues in a conventional manner. If a subscriber subscribes to multiple subscriber services that are triggered by the trigger, the query mediator 52 determines which service (i.e., SPA) to execute first, and this service is executed from either the combined SPA, if used, or the individual SPA. After the service has completed, the next service is executed, as determined by the query mediator, or processing continues conventionally without further services being executed (if a conflict would otherwise arise, for example).

Figure 4:
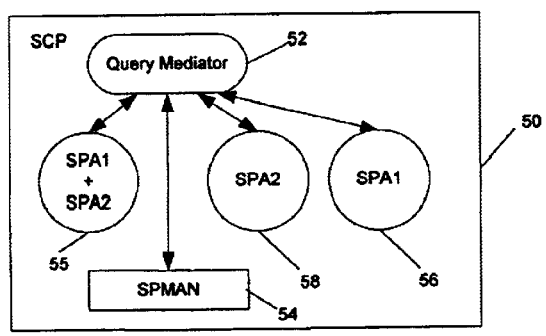
FIG. 4 shows a simplified schematic diagram of a further exemplary service control point in accordance with the present invention.

Alternatively, as shown in FIG. 4, a combined SPA 55 can handle subscribers who subscribe to both features, and individual SPAs 56, 58 can reside in the SCP 50 to handle subscribers who only subscribe to one of the features. Routing will be dependent upon whether the subscriber subscribes to one service or both (or all of the plurality of) services associated with a particular trigger. Calls to a subscriber having only one subscriber feature will be routed to the individual SPA, and calls a subscriber having multiple subscriber features will be routed to the combined SPA.

Figure 5:
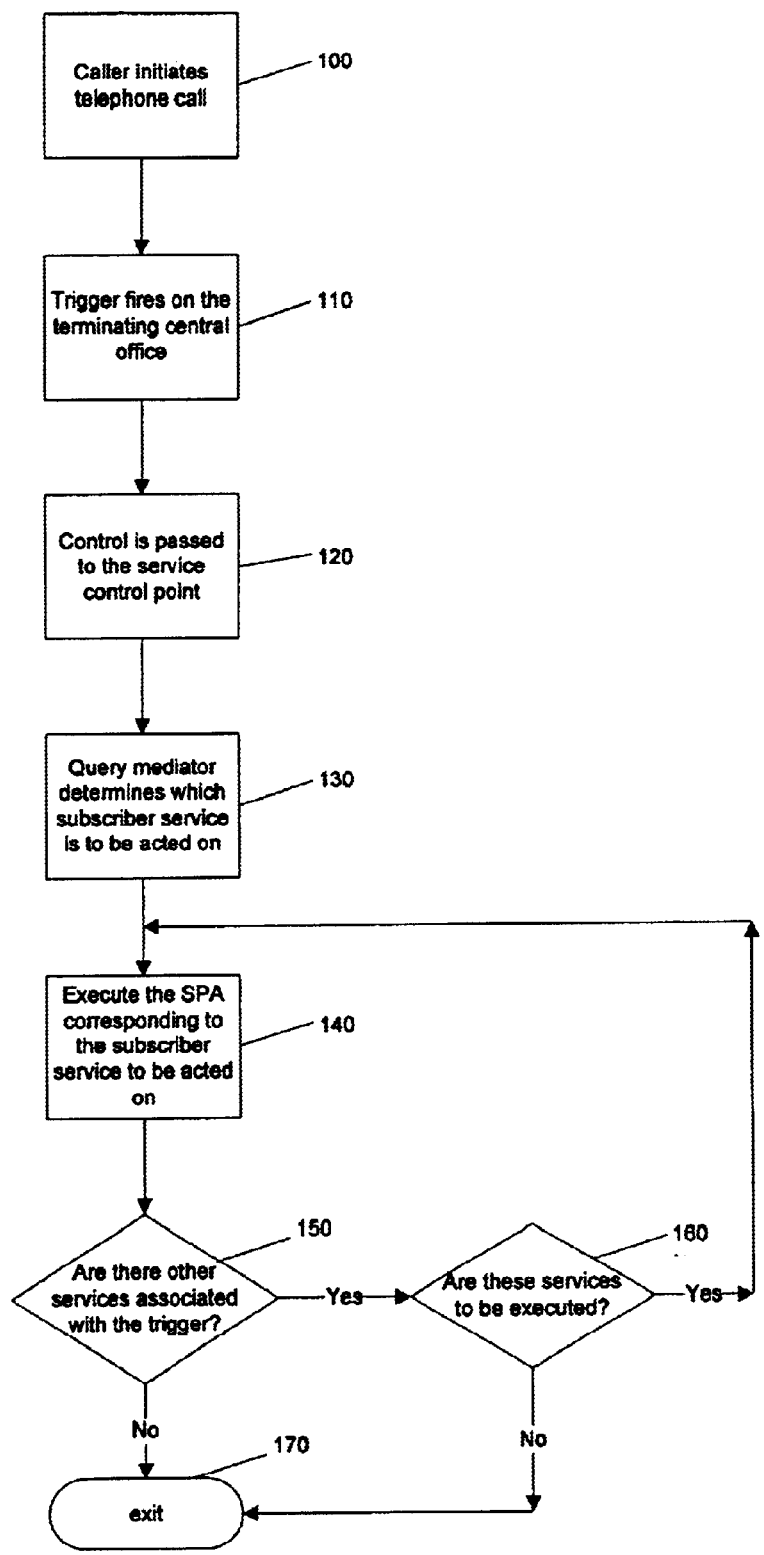
FIG. 5 shows a flow chart of an exemplary method of operation of the system of FIG. 1 in accordance with the present invention.

FIG. 5 shows a flow chart of an exemplary method of operation of the system of FIG. 1 in accordance with the present invention. At step 100, the caller 20 dials a number that is transmitted to its associated central office (the originating central office 30) in a conventional manner. After a caller dials the subscriber's number, a trigger (e.g., an AIN trigger such as a TAT) fires on the subscriber's line (i.e., the terminating central office 70), at step 110; Thus, the central office 30 detects the caller's instructions and requests a call setup to the subscriber's central office (the terminating central office 70) via a service control point 50, at step 120. Therefore, a trigger query (e.g., a TAT query) is launched in the SCP 50 via the SP manager 54. Upon receiving a trigger, the SCP determines what services the subscriber subscribes to, and will invoke the services in a particular order.

More particularly, the SP manager 54 sends the query to the query mediator 52. At step 130, the query mediator 52 determines the services that the subscriber subscribes to that are associated with the trigger, and determines an execution order or hierarchy of the active subscriber services. The query mediator 52 determines which subscriber feature to execute first, and whether to exit thereafter, or continue processing by executing other subscriber features. At step 140, the query mediator 52 passes control to the appropriate subscriber service SPA, and that SPA is executed. After the SPA is completed, it is determined if other services are associated with the trigger, at step 150, that have not been executed yet. If there are no further subscriber services that have not been executed, then the method exits at step 170 and processing of the telephone call continues in a conventional manner. After the subscriber feature is completed, a completion signal is sent to the SCP 50, instructing the next subscriber feature to be activated, or to exit processing and continue with normal telephone operation.

If there are further subscriber services that have not yet been executed, then it is determined by the query mediator 52 at step 160 the next one of these services (if any) that are to be executed, based on the execution order or hierarchy that was determined at step 130. The next subscriber service is then executed, with processing continuing at step 140. If the query mediator 52 determines that no remaining unexecuted subscriber services are to be executed, perhaps because of conflict, then the method exits at step 170 and processing of the telephone call continues in a conventional manner.

One exemplary manner in which the query mediator determines an order of execution of multiple subscriber services associated with the same trigger is to use a predetermined priority order. For example, service 1 is always executed before service 2, and service 2 is always executed before service 3. Thus, if a subscriber subscribes to services 1 and 3, service 1 will always execute first, responsive to the query mediator, and then service 3 will execute, if there is no conflict or other bar to execution, such as if service 1 performed the call disposition (e.g., forwarded the call or disconnected the call). If a subscriber only subscribes to one service, such as service 2 for example, then that service will always execute upon receipt of its associated trigger.

The present invention provides a faster, cheaper, less complex technique of providing multiple subscriber features on a single trigger. Moreover, there is no need for communications between the SPAs.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method for providing a plurality of subscriber services associated with a trigger to a subscriber responsive to a call, comprising:

receiving the trigger;

determining a plurality of subscriber services that are associated with the trigger;

determining which of the subscriber services associated with the trigger are active prior to executing any of the subscriber services;

determining a priority for each of the active subscriber services;

selecting a service package application at which to execute an active subscriber service having the highest priority; and executing the active subscriber service having the highest priority at the selected service package application.

2. The method according to claim 1, further comprising executing the subscriber service having the next highest priority.

3. The method according to claim 1, further comprising executing the remaining subscriber services in priority order.

4. The method according to claim 1, further comprising determining if the executed subscriber service has disposed of the call, and terminating the remainder of the plurality of subscriber services responsive to the call disposition.

5. The method according to claim 1, wherein determining the priority for each of the plurality of subscriber services comprises determining a number of the subscriber services that are activated by the subscriber, and determining a priority for each of the active subscriber services.

6. The method of claim 1, comprising selecting from a plurality of service package applications a service package application at which to execute the active subscriber service having the highest priority.

7. A method for establishing a call connection between a calling party and a subscriber, comprising:

receiving an incoming call request from the calling party to the subscriber at a central office associated with the subscriber;

activating a trigger corresponding to a plurality of subscriber services;

determining which of the subscriber services associated with the trigger are active prior to executing any of the subscriber services;

determining a priority for each of the active subscriber services;

selecting a service package application at which to execute an active subscriber service having the highest priority;

executing the active subscriber service having the highest priority at the selected service package application; and establishing the call connection if the subscriber services do not otherwise dispose of the call.

8. The method according to claim 7, wherein the trigger is a TAT trigger.

9. The method according to claim 7, wherein determining the priority for each of the subscriber services comprises determining a number of the subscriber services that are activated by the subscriber, and determining a priority for each of the active subscriber services.

10. The method according to claim 9, wherein executing the subscriber services comprises executing the unexecuted active subscriber service having the highest priority; determining if the executed subscriber service has disposed of the call; and terminating the remainder of the plurality of subscriber services responsive to the call disposition.

11. A system for providing a plurality of subscriber services associated with a trigger to a subscriber responsive to a call, comprising:

a central office associated with the subscriber for receiving the trigger;

a service control point coupled to the central office for storing the plurality of subscriber services, determining a plurality of subscriber services that are associated with the trigger, and determining which of the subscriber services associated with the trigger are active prior to the execution of any of the subscriber services;

a query mediator coupled to the service control point for determining a priority for each of the active subscriber services responsive to the trigger, and selecting a service package application at which to execute an active subscriber service having the highest priority; and the selected service package application coupled to the query mediator for executing the active subscriber service having the highest priority.

12. The system according to claim 11, wherein the trigger is a TAT trigger.

13. The system according to claim 11, wherein the selected service package application executes the remaining subscriber services in priority order.

14. The system according to claim 11, wherein the query mediator determines if the executed subscriber service has disposed of the call, and terminates the remainder of the plurality of subscriber services responsive to the call disposition.

15. The system according to claim 11, wherein the query mediator determines a number of the subscriber services that are activated by the subscriber, and determines a priority for each of the active subscriber services.

16. The system according to claim 11, wherein the service control point comprises the query mediator and the selected service package application.

17. The method of claim 11, wherein the selected service package application executes a plurality of the active services.

18. A system for establishing a call connection between a calling party and a subscriber, comprising:

a central office for receiving an incoming call request from the calling party to the subscriber, the central office being associated with the subscriber, the incoming call request generating a trigger;

a service control point coupled to the central office for storing a plurality of subscriber services associated with the trigger, and determining which of the subscriber services associated with the trigger are active prior to the execution of any of the subscriber services;

a query mediator coupled to the service control point for determining a priority for each of the active subscriber services responsive to the trigger and selecting a service package application at which to execute an active subscriber service having the highest priority;

a controller coupled to the query mediator for providing the trigger to the query mediator; and the selected service package application for executing the active subscriber service having the highest priority, and establishing the call connection if the subscriber services do not otherwise dispose of the call.

19. The system according to claim 18, wherein the trigger is a TAT trigger.

20. The system according to claim 18, wherein the query mediator determines a number of the subscriber services that are activated by the subscriber, and determines a priority for each of the active subscriber services.

21. The system according to claim 20, wherein the selected service package application executes the unexecuted active subscriber service having the highest priority, determines if the executed subscriber service has disposed of the call, and terminates the remainder of the plurality of subscriber services responsive to the call disposition.

22. The system according to claim 18, wherein the service control point comprises the query mediator, the selected service package application, and the controller.

23. A method for providing a plurality of subscriber services associated with a trigger to a subscriber responsive to a call, comprising:

receiving the trigger;

determining a plurality of subscriber services that are associated with the trigger;

determining which of the subscriber services associated with the trigger are active prior to executing any of the subscriber services;

determining a priority for each of the active subscriber services;

selecting from a plurality of service package applications a service package application at which to execute the active services; and executing the active subscriber service having the highest priority at the selected service package application.

24. The method of claim 23, comprising determining that a plurality of subscriber services associated with the trigger are active prior to executing any of the subscriber services.

25. The method of claim 24, comprising selecting from a plurality of service package applications a combined service package application at which to execute the plurality of active services.

26. The method of claim 23, comprising determining that a single subscriber service associated with the trigger is active prior to executing any of the subscriber services.

27. The method of claim 26, comprising selecting from a plurality of service package applications an individual service package application at which to execute the single active service.

* * * * *